United States Patent
Kornegay

[11] Patent Number: 6,070,287
[45] Date of Patent: Jun. 6, 2000

[54] COVER FOR WINDSHIELD WIPER BLADE APPARATUS

[76] Inventor: Thomas J. Kornegay, 3724 W. Bloomfield Rd., Phoenix, Ariz. 85029

[21] Appl. No.: 09/169,156

[22] Filed: Oct. 9, 1998

Related U.S. Application Data

[60] Provisional application No. 60/066,363, Nov. 21, 1997.

[51] Int. Cl.⁷ .................. A47L 1/00; B60S 1/02
[52] U.S. Cl. .................. 15/250.001; 15/250.41; 15/247
[58] Field of Search ............ 15/250.001, 250.41, 15/250.4, 250.361, 250.19, 250.48, 250.03, 246, 247

[56] References Cited

U.S. PATENT DOCUMENTS

| | | | |
|---|---|---|---|
| 2,141,023 | 12/1938 | Ryan | 15/250.361 |
| 3,199,563 | 8/1965 | Forrest | 15/246 |
| 3,380,504 | 4/1968 | Green | 15/247 |
| 3,936,901 | 2/1976 | Theckston . | |
| 5,235,720 | 8/1993 | Kinder | 15/250.41 |
| 5,412,177 | 5/1995 | Clark . | |
| 5,617,607 | 4/1997 | Chen . | |
| 5,634,841 | 6/1997 | Gold | 15/250.41 |
| 5,732,436 | 3/1998 | Reigenbaum | 15/250.41 |

FOREIGN PATENT DOCUMENTS

| | | |
|---|---|---|
| 2315891 | 10/1974 | Germany . |
| 2517489 | 10/1976 | Germany . |
| 588368 | 5/1977 | Switzerland . |

*Primary Examiner*—Robert J. Warden, Sr.
*Assistant Examiner*—Andrew Aldag
*Attorney, Agent, or Firm*—Parsons & Goltry; Michael W. Goltry; Robert A. Parsons

[57] ABSTRACT

In windshield wiper blade apparatus including a wiper blade assembly carried by a wiper arm, the wiper blade assembly including a first end, a second end and a wiper blade, a cover for substantially engulfing the wiper blade assembly for protecting the wiper blade, the cover comprising a cover body having a first pocket for receiving and substantially engulfing a first portion of the wiper blade assembly in a direction from one of the first and second ends, and a second pocket for receiving and substantially engulfing a second portion of the wiper blade assembly in a direction from the other one of the first and second ends, and one of the first and second pockets movable between an open position for receiving one of the first and second portions and a closed position for substantially engulfing one of the first and second portions.

13 Claims, 2 Drawing Sheets

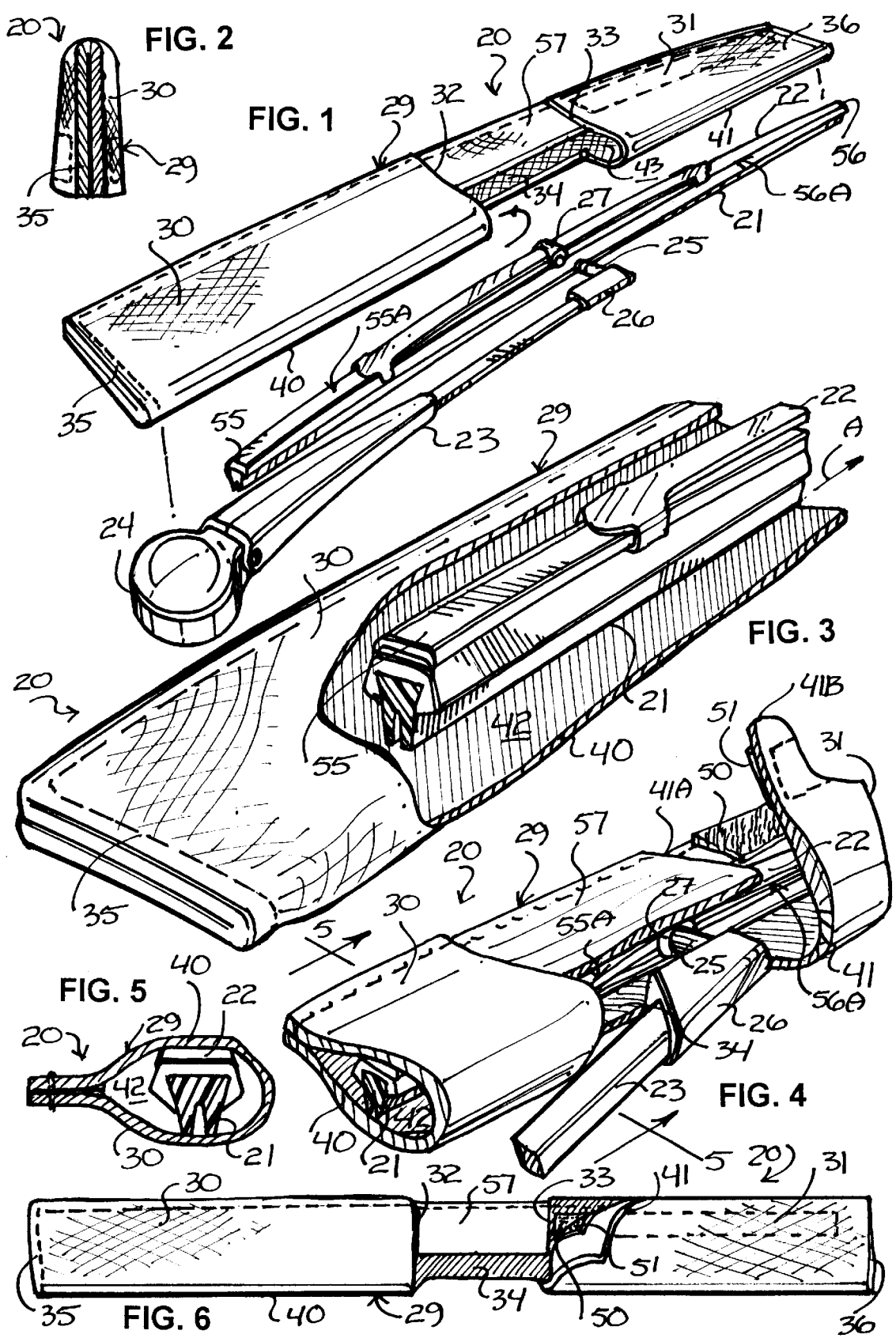

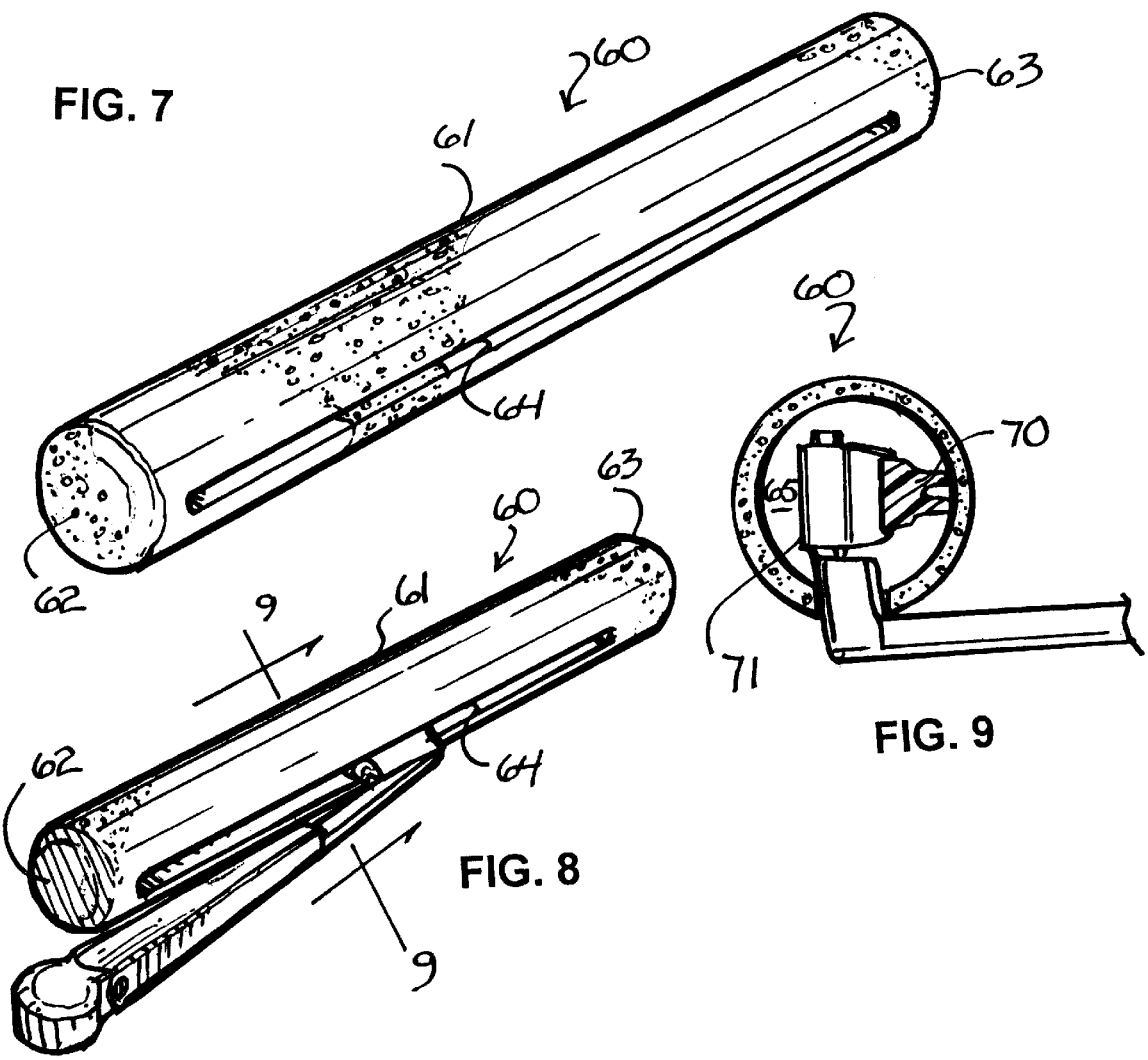

COVER FOR WINDSHIELD WIPER BLADE APPARATUS

This application claims the benefit of U.S. Provisional Application Ser. No. 60/066,363, filed Nov. 21, 1997.

FIELD OF THE INVENTION

This invention relates generally to the field of covers and, more particularly, to covers for windshield wiper blade apparatus.

BACKGROUND OF THE INVENTION

Windshield wiper blade apparatus normally comprise a wiper blade assembly carried by a wiper arm mounted for movement in reciprocal directions adjacent a windshield of a vehicle such as a car, boat, plane, etc. The wiper blade assembly normally carries a removable wiper blade that engages the windshield for effecting removal of water and debris. Because wiper blades are normally constructed of rubber or other similar material, exposure of the wiper blade to sunlight and other adverse weather conditions normally causes irreparable damage to the wiper blades. This is especially true with recreational vehicles that are normally stored outdoors for prolonged periods of time.

Wiper blades are very expensive to replace. Although owners of recreational vehicles normally drape specially designed covers or tarpaulins over their vehicles to shield their vehicles from sun and other potentially damaging weather, these covers or tarpaulins are expensive and fail to provide users with an economical means of specifically protecting the wiper blades from sun and weather exposure.

Accordingly, it would be highly desirable to provide new and improved covers for windshield wiper blade apparatus.

It is a purpose of the present invention to provide new and improved covers for windshield wiper blade apparatus that are easy to construct.

It is another purpose of the present invention to provide new and improved covers for windshield wiper blade apparatus that are inexpensive.

It is still another purpose of the present invention to provide new and improved covers for windshield wiper blade apparatus that are easy to use.

It is a further purpose of the present invention to provide new and improved covers for windshield wiper blade apparatus that are easy to install.

It is still a further purpose of the present invention to provide new and improved covers for substantially reducing weather damage to windshield wiper blades.

SUMMARY OF THE INVENTION

The above problems and others are at least partially solved and the above purposes and others are realized in a new and improved cover for a windshield wiper blade assembly. In windshield wiper blade apparatus including a wiper blade assembly carried by a wiper arm, the wiper blade assembly including a first end, a second end and a wiper blade, a cover of the present invention may generally comprise a cover body having a first pocket for receiving and substantially engulfing a first portion of the wiper blade assembly in a direction from one of the first and second ends, and a second pocket for receiving and substantially engulfing a second portion of the wiper blade assembly in a direction from the other one of the first and second ends. In accordance with a preferred embodiment, one of the first and second pockets may be provided as movable between an open position for receiving one of the first and second portions and a closed position for substantially engulfing one of the first and second portions.

The cover of the present invention may further include an engagement assembly for securing the one of the first and second pockets in the closed position. The engagement assembly may include an engagement element carried adjacent a free edge of the one of the first and second pockets, and a detachably engagable complemental engagement element carried adjacent another free edge of the one of the first and second pockets.

BRIEF DESCRIPTION OF THE DRAWINGS

The foregoing and further and more specific objects and advantages of the instant invention will become readily apparent to those skilled in the art from the following detailed description thereof taken in conjunction with the drawings in which:

FIG. 1 illustrates a perspective view of a cover for protecting a wiper blade of windshield wiper blade apparatus shown spaced from the cover, the cover set forth in accordance with a preferred embodiment of the present invention;

FIG. 2 illustrates an end elevational view of the cover of FIG. 1;

FIG. 3 illustrates a fragmented perspective view the cover of FIG. 1 shown as it would appear being mounted with the windshield wiper blade apparatus, portions of the cover being broken away for the purposes of illustration;

FIG. 4 illustrates a fragmented perspective view of the cover of FIG. 1 shown as it would appear partially mounted with the windshield wiper blade apparatus;

FIG. 5 illustrates a sectional view taken along line 55 of FIG. 4;

FIG. 6 illustrates a front elevational view of the cover of FIG. 1;

FIG. 7 illustrates a perspective view of a cover for protecting a wiper blade of a windshield wiper blade apparatus, in accordance with an alternate embodiment of the present invention;

FIG. 8 illustrates the cover of FIG. 7 shown as it would appear mounted with the windshield wiper blade apparatus; and FIG. 9 illustrates a sectional view taken along line 9—9 of FIG. 8.

DETAILED DESCRIPTION OF A PREFERRED EMBODIMENT

Turning now to the drawings, in which like reference characters indicate corresponding elements throughout the several views, attention is first directed to FIG. 1 illustrating a perspective view of a cover 20 for protecting a wiper blade 21 of a wiper blade assembly 22 of windshield wiper blade apparatus shown spaced from cover 20, in accordance with a preferred embodiment of the present invention. Wiper blade assembly 22 is generally intended to be of a variety commonly used to wipe away rain water, snow and debris away from a windshield on a vehicle such as a car, a truck, a recreational vehicle, a boat, etc. Thus, and in accordance with conventional practice, a wiper arm 23 may be connected to a transmission shaft (not shown) of a wiper motor (not shown) near the base of a windshield of a vehicle at a connecting hub 24 of wiper arm 23. Customarily, to connect wiper blade assembly 22 with wiper arm 23, a connecting pin 25 carried by a distal end 26 of wiper arm 23 may be inserted into a sleeve 27 formed in a top center portion of wiper blade assembly 22 where it may snap into place. In accordance with conventional practice, and although not herein specifically shown, a release button may be pushed inwardly to allow removal of wiper blade assembly 22 from wiper arm 23. In accordance with conventional wiper blade assemblies such as wiper blade assembly 22, wiper blade 21 is generally intended to be replaceable.

With continuing reference to FIG. 1 and additional reference to FIG. 6 illustrating a front elevational view of cover 20, cover 20 is generally comprised of a cover body 29 constructed of a substantially pliant material such as vinyl, canvass or other similar material, cover body 29 including a pair of diametrically opposed pockets or sleeves 30 and 31. Sleeves 30 and 31 are substantially elongate and include diametrically opposed open ends 32 and 33 interconnected in spaced apart relation by a bridge 34, sleeves 30 and 31 terminating respectively with closed free ends 35 and 36, sleeve 30 and closed free end 35 being further and specifically illustrated in FIG. 2. Each sleeve 30 and 31 is generally defined by a continuous sidewall 40 and 41 bounding and otherwise enclosing a chamber 42 (shown only in FIGS. 3–5) and 43 (shown only in FIG. 1) extending from open end 32 and 33 to closed free end 35 and 36, respectively.

Regarding a preferred but not essential manner of construction of sleeve 30, sidewall 40 in FIG. 1 and FIGS. 3–5 is shown having been folded over itself so as to be continuous with edges thereof engaged, such as by sewing, to form sleeve 30. As set forth in FIG. 1, sidewall 41, like sidewall 40, is shown having been folded over itself so as to be continuous with edges thereof engaged, such as by a suitable engagement mechanism, to form sleeve 31. With momentary attention directed to FIG. 4, sidewall 41 includes an engagement element 50 and a complemental engagement element 51 carried proximate respective and opposing free edges 41A and 41B, respectively, of sidewall 41. Engagement element 50 is detachably engagable with complemental engagement element 51 for detachably engaging the edges 41A and 41B together to form sleeve 31. Preferably extending along substantially the entire length of sleeve 31 from open end 33 to closed free end 36, engagement element 51 and complemental engagement element 52 may be preferably but not essentially provided as a hook medium and a loop medium, respectively, an engagement assembly commonly found under the exemplary trademark VELCRO®. However, other engagement mechanisms suitable for allowing the detachable engagement of edges of sidewall 41 to form sleeve 31 may be used if so desired such as conventional snap mechanisms, buttons or the like.

To install cover 20 with wiper blade assembly 22, and with attention directed to FIG. 1, a user may insert a first end 55 of wiper blade assembly 22 into and through open end 32 of sleeve 30 and by pulling cover body in the direction indicated by the arrowed line A in FIG. 3, pull sleeve 30 over wiper blade assembly 22 to substantially cover or otherwise engulf a first portion or length 55A (shown only in FIGS. 1 and 4) of wiper blade assembly 22 from first end 55 to sleeve 27 as generally shown in FIG. 4 and FIG. 5 with first end 55 of wiper blade assembly 22 to reside adjacent to or otherwise abut closed free end 35. Upon installation of sleeve 30 with wiper blade assembly 22 generally in the foregoing manner, sleeve 31 may then be installed with wiper blade assembly 22. In this regard, engagement element 50 and complemental engagement element 51 may first be disengaged such as by a user grasping the respective edges carrying engagement element 50 and complemental engagement element 51 and pulling them away from one another. Sidewall 41 may then be positioned adjacent wiper blade assembly 22 and then folded over itself and a second portion or length 56A (shown only in FIGS. 1 and 4) of wiper blade assembly 22 extending from a second end 56 thereof to sleeve 27 so as to be continuous and then engagement element 50 and complemental engagement element 51 engaged to form sleeve 31, sleeve 31 to substantially cover or otherwise engulf wiper blade assembly 22 from second end 56 to sleeve 27 as shown in FIG. 4 with second end 56 of wiper blade assembly 22 to reside adjacent to or otherwise abut closed free end 36. To remove cover 20 from wiper blade assembly 22, the foregoing process may be reversed. It should be generally understood that first and second portions, 55A and 56A, cooperate to generally define the overall length of wiper blade assembly 22.

Once installed in the foregoing manner, those portions of wiper blade assembly 22, including wiper blade 21, extending from first end 55 to sleeve 27 and from second end 56 to sleeve 27 will be substantially enclosed within chamber 42 and 43 of sleeve 30 and 31, respectively. To cover portions of wiper blade assembly 22, including wiper blade 21, residing intermediate open ends 32 and 33, cover body 29 may further include a flap 57 (shown in FIGS. 1, 4 and 6) coupled with bridge 34 and extending substantially from open end 32 to open end 33. In this manner of construction, wiper blade assembly 22, including wiper blade 21, may be positioned or otherwise sandwiched between bride 34 and flap 57 and covered or otherwise concealed as shown in FIG. 4. Although not an essential feature, flap 57 may be engaged with bridge 34 by virtue of conventional sewing techniques.

Those having regard toward the relevant art will readily appreciate that cover 20 is easy to install and provides an exemplary apparatus for covering and otherwise substantially engulfing wiper blade assembly 22 and wiper blade 21 to protect wiper blade assembly 22 and wiper blade 21 from becoming damaged as a result of exposure to, for example, the Sun's harmful ultraviolet rays. For instance, conventional wiper blades, such as wiper blade 21, are normally constructed of rubber and need to be periodically replaced as the rubber becomes worn and damaged not only from use, but also from exposure to the harmful ultra-violet rays emitted from the Sun. However, wiper blades can be extremely expensive. Thus, cover 20 provides an exemplary mechanism for allowing a user to install with and thus protect wiper blades, such as wiper blade 21, from premature damage that normally results from exposure to the Sun's harmful ultra-violet rays. Cover 20 is therefore particularly useful to owners of recreational vehicles who normally store their recreational vehicles for extended periods of nonuse. In this regard, prior to storing his or her recreational vehicle, a user may install one or more covers 20 in the previously described manner to protect one or more of the wiper blades of the recreational vehicle from becoming prematurely damaged as a result to exposure to ultraviolet rays. However, cover 20 may also be installed and employed during use of a vehicle and safely used during normal driving activity. To enhance the ability of cover 20 to withstand harmful ultra-violet rays and protect wiper blade 21 from damage, cover body 29 may be provided or otherwise treated with a selected and conventional ultraviolet protectant or otherwise constructed of a substantially pliant, ultra-violet ray resistant material if so desired.

With attention directed to FIGS. 7–9, set forth is a perspective view of a cover 60 for protecting, as illustrated in FIG. 9, a wiper blade 70 of a wiper blade assembly 71 of windshield wiper blade apparatus, in accordance with an alternate embodiment of the present invention. Preferably constructed of a substantially compressive material such a selected foam material or rubber, and with attention directed to FIGS. 7 and 8, cover 60 is generally comprised of an elongate body 61 having opposed closed free ends 62 and 63. Having a preferred, although not essential, substantially cylindrical shape, body 61 further includes a slot 64 extending along substantially the entire length thereof from closed free end 62 to closed free end 63 accessing a chamber 65 bound by body 61 and extending substantially from closed free end 62 to closed free end 63, chamber 65 shown only in FIG. 9 illustrating a sectional view taken along line 9—9 of FIG. 8 with FIG. 8 illustrating cover 60 as it would appear mounted to substantially cover or otherwise engulf wiper blade assembly 70 and wiper blade 71 illustrated only in FIG. 9.

Like cover 20, cover 60 is operative for concealing wiper blade 71 and thus protecting wiper blade 71 from the Sun's harmful ultra-violet rays. To install cover 60, a user may simply insert wiper blade assembly 70 and wiper blade 71 into chamber 65 through slot 64 with the compressive nature of body 61 to compress against and couple with wiper blade assembly 70. Furthermore, to enhance the ability of cover 60 to withstand harmful ultra-violet rays and protect wiper blade 71 from damage, body 61 may be provided or otherwise treated with a selected and conventional ultraviolet protectant or otherwise constructed of a substantially compressive, ultra-violet ray resistant material if so desired.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A cover for receiving and substantially engulfing a wiper blade assembly attached to a hub of a wiper arm for protecting a wiper blade attached to the wiper blade assembly, the cover comprising:

an elongate cover body having an upper edge, a back wall with a lower edge and first and second flaps at opposite ends of the back wall;

the upper edge having a central opening located between the first and second flaps for accommodating the hub;

the first and second flaps having free ends and being folded over and attached to the back wall such that the free ends are substantially flush with the lower edge;

the first and second flaps defining first and second pockets, the first pocket for receiving and substantially engulfing a first portion of the wiper blade assembly, the second pocket for receiving and substantially engulfing a second portion of the wiper blade assembly, at least one of the first and second flaps being movable between an open position for receiving one of the first and second portions and a closed position for substantially engulfing one of the first and second portions; and means for releasably securing the one of the first and second flaps to the back wall.

2. The cover of claim 1, wherein the means comprises:

an engagement element carried adjacent the lower edge of the back wall; and a detachably engagable complemental engagement element carried adjacent a free end of the one of the first and second flaps.

3. The cover of claim 2, wherein the engagement element comprises one of a hook and loop medium.

4. The cover of claim 2, wherein the complemental engagement element comprises one of a hook and loop medium.

5. The cover of claim 1, wherein the cover body is constructed of a substantially pliant material.

6. The cover of claim 1, wherein at least one of (a) the first pocket includes an open end for receiving the first portion of the wiper blade assembly and (b) the second pocket includes an open end for receiving the second portion of the wiper blade assembly.

7. A cover for receiving and substantially engulfing a wiper blade assembly attached to a hub of a wiper arm for protecting a wiper blade attached to the wiper blade assembly, the cover comprising:

an elongate cover body having an upper edge, a back wall with a lower edge and opposing ends, a first pocket at one of the opposing ends for receiving and substantially engulfing a first portion of the wiper blade assembly, and a flap at the other one of the opposing ends;

the upper edge having a central opening located between the first pocket and the flap for accommodating the hub;

the flap having a free end and being folded over and attached to the back wall such that the free end is substantially flush with the lower edge;

the flap defining a second pocket for receiving and substantially engulfing a second portion of the wiper blade assembly, the second pocket being movable between an open position for receiving the second portion and a closed position for substantially engulfing the second portion; and engagement means for releasably securing the flap to the back wall.

8. The cover of claim 7, wherein the engagement means comprises:

an engagement element carried adjacent the lower edge of the back wall; and a detachably engagable complemental engagement element carried adjacent a free end of the flap.

9. The cover of claim 8, wherein the engagement element comprises one of a hook and loop medium.

10. The cover of claim 8, wherein the complemental engagement element comprises one of a hook and loop medium.

11. The cover of claim 7, wherein the cover body is constructed of a substantially pliant material.

12. The cover of claim 7, wherein at least one of (a) the first pocket includes an open end for receiving the first portion of the wiper blade assembly and (b) the second pocket includes an open end for receiving the second portion of the wiper blade assembly.

13. The cover of claim 7, wherein the first pocket includes an open end for receiving the first portion of the wiper blade assembly and the second pocket includes an open end for receiving the second portion of the wiper blade assembly.

* * * * *